March 22, 1960  J. T. LONGDON  2,929,484
AUTOMATIC ASSEMBLY MACHINE
Filed July 1, 1957  4 Sheets-Sheet 1

INVENTOR.
John T. Longdon
BY Paul O. Pippel
Atty

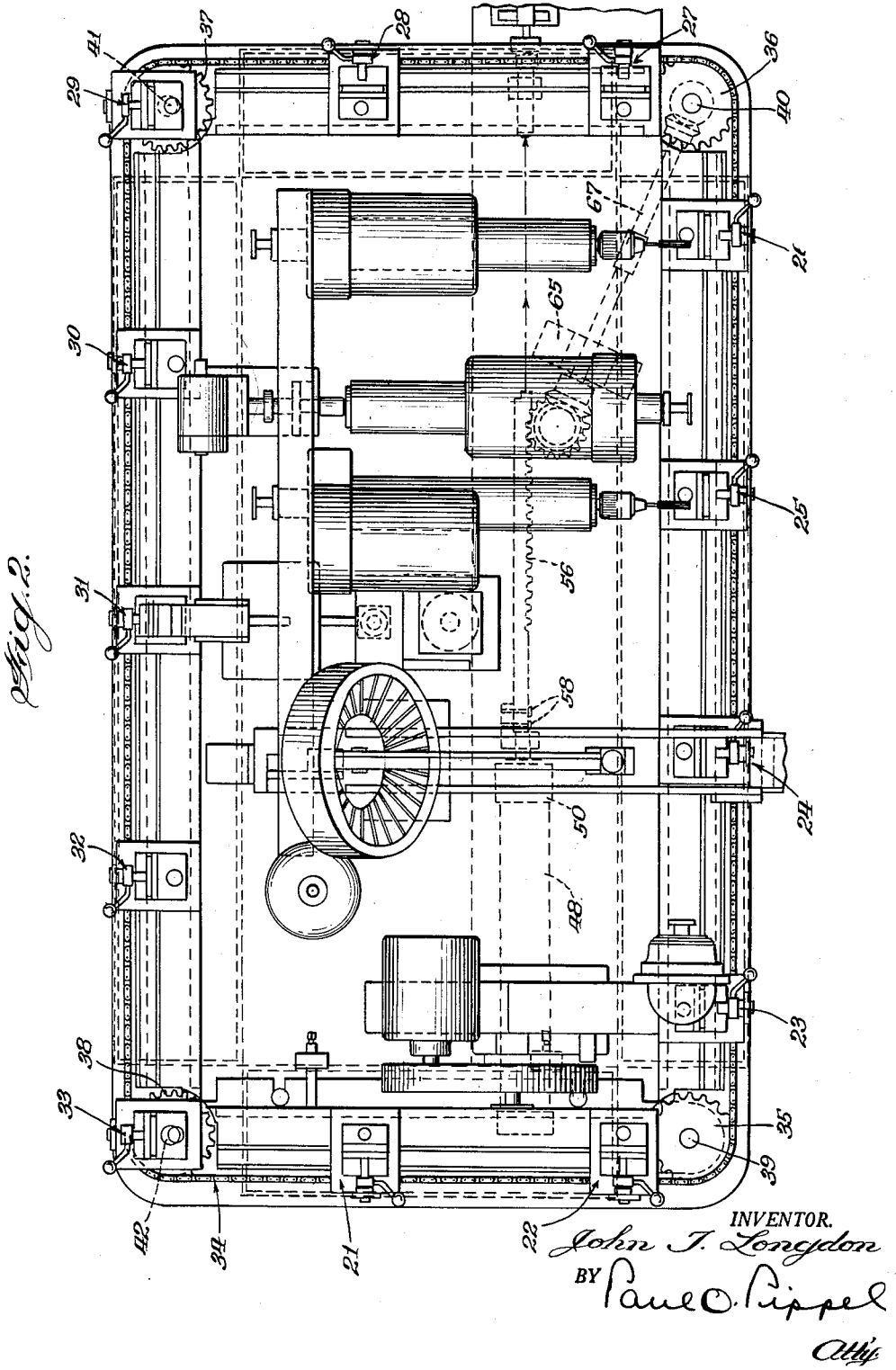

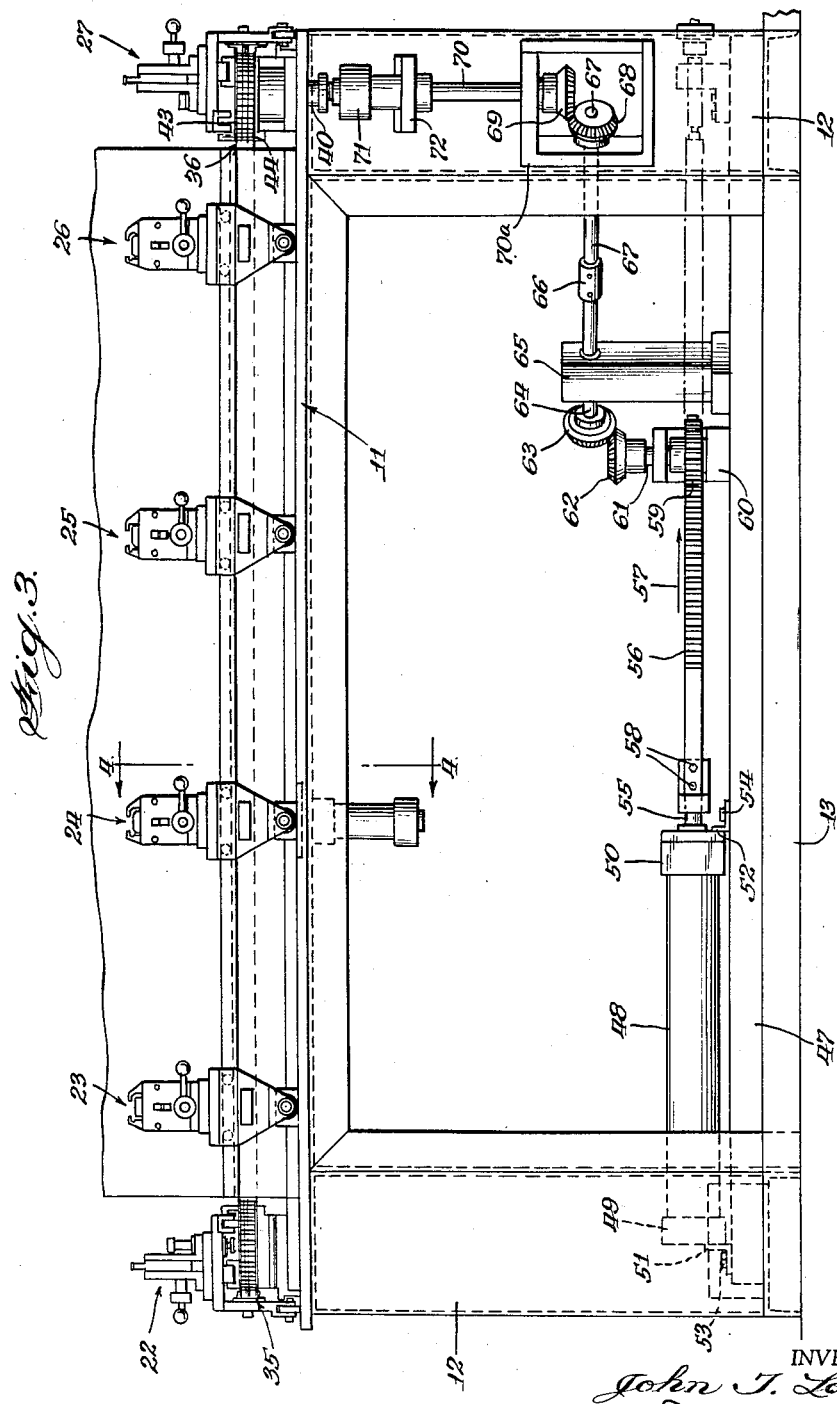

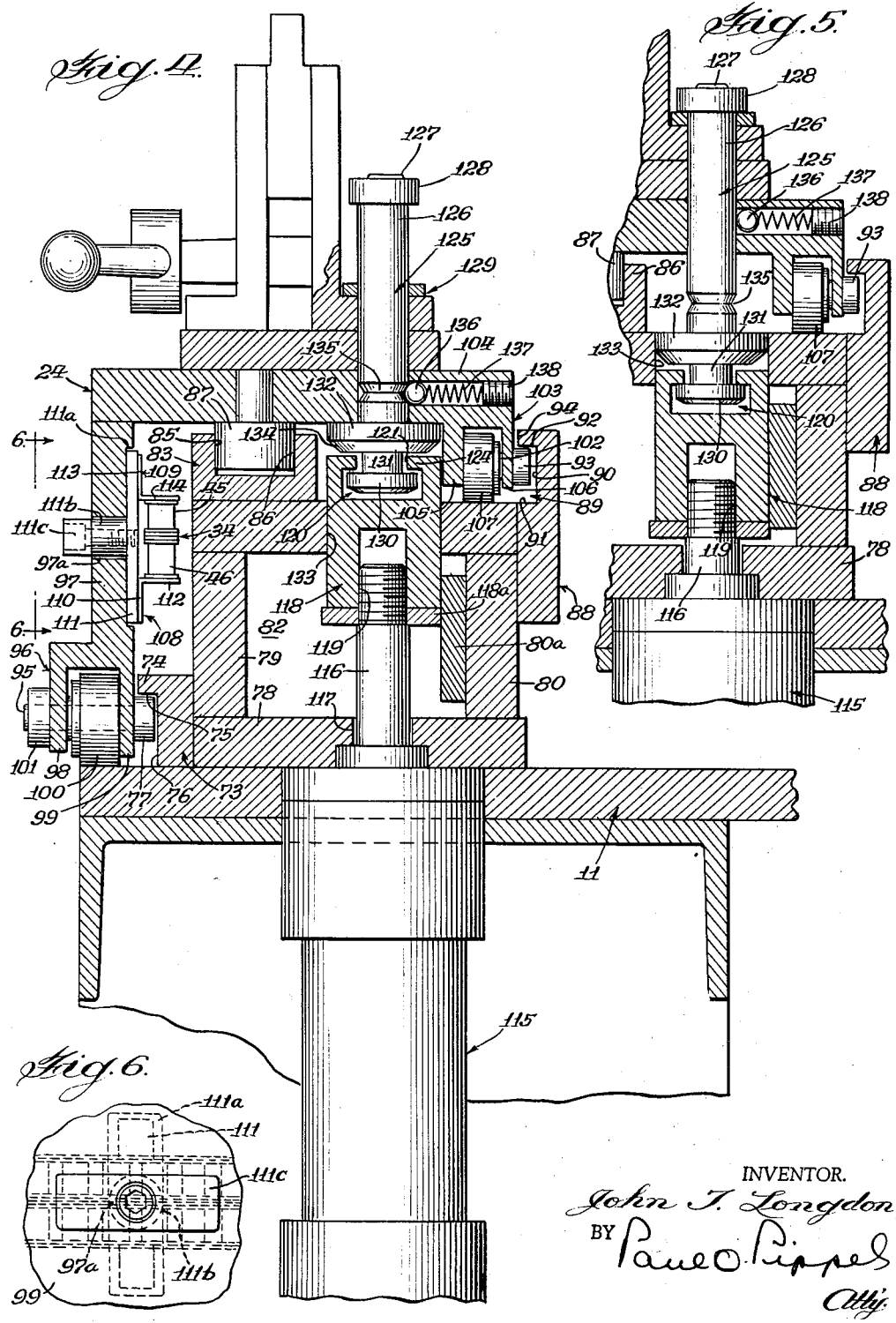

United States Patent Office 2,929,484
Patented Mar. 22, 1960

2,929,484

AUTOMATIC ASSEMBLY MACHINE

John T. Longdon, Chicago, Ill., assignor to International Harvester Company, Chicago, Ill., a corporation of New Jersey Application July 1, 1957, Serial No. 669,345

6 Claims. (Cl. 198—19)

This invention relates to a new and improved automatic assembly machine.

It is thus a principal object of the present invention to provide a station indexing table for an assembly mechanism which successively performs various work on the articles being worked on and assembled at each of the several stations.

An important object of this invention is the provision of an indexing table having a plurality of work holding fixtures adapted to move together and be indexed from station to station on the table whereupon different work operations may be performed on the work material held by the fixtures at each of the several stations.

Another important object of this invention is to supply an indexing table employing a roller chain adapted to move work holding fixtures from station-to-station around the table.

Another and further important object of this invention is to equip an indexing table with chain means for moving work-holding fixtures from station-to-station around the table and overrunning clutch means in the drive of the chain to permit final indexing of the work-holding fixtures by separate means at each of the several stations independently from the movement of the chain.

A still further important object of this invention is to provide a work fixture centering means at each station around the indexing table including a pilot centering means whereby the fixture is mechanically urged into a proper station positioning whereby the work to be performed at that station or the assembly of other parts with the part held by the fixture may be successfully completed and may be uniform on all work performed at that station.

A further important object of this invention is the provision of means in an indexing table for employing a fluid operated cylinder to generally advance a plurality of work-holding fixtures on the table one station and to employ fluid operated means for accurately centering and locking each of the work-holding fixtures at each station on the indexing table.

A still further important object of this invention is to provide cooperative track and track engaging means on an indexing table for holding fixtures thereon.

Still another important object of this invention is to supply a plurality of holding fixtures which may be indexed about a table in uniform spaced relationship and including means for locking each holding fixture in centered station position independently of each other holding fixture.

Other and further important objects and advantages will become apaprent from the disclosures in the following specification and accompanying drawings:

In the drawings:

Figure 2 is a top plan view of the device as shown in Figure 1;

Figure 3 is a side elevational view of a portion of the automation assembly machine;

Figure 4 is a side sectional view of the work-holding fixture and track of this invention taken on the line 4—4 of Figure 3;

Figure 5 is a detail of a portion of the device of Figure 4 shown with the work-holding fixture centered and locked in station position; and Figure 6 is a detail elevational view taken on the line 6—6 of Figure 4.

Figure 1:
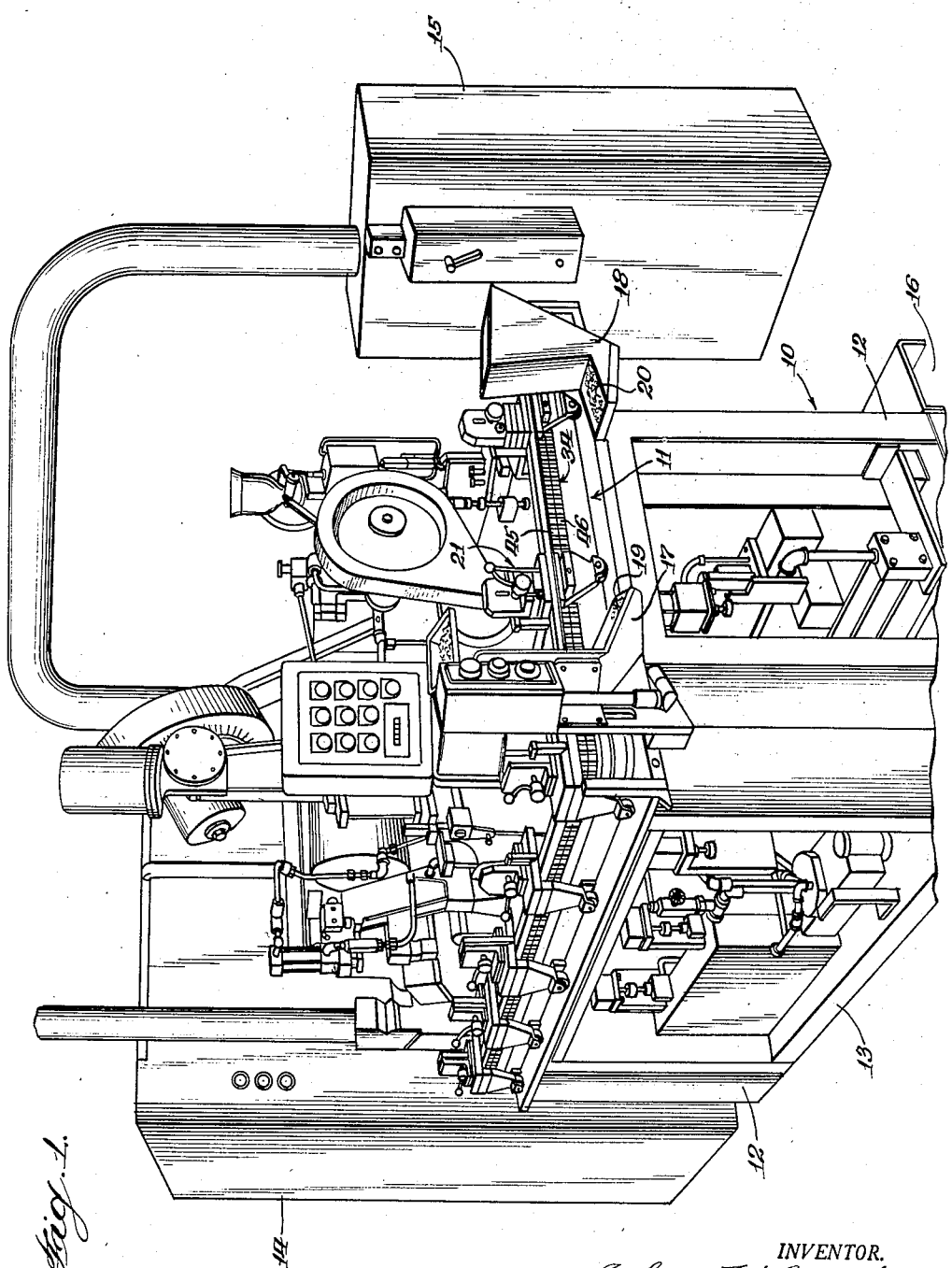
Figure 1 is a perspective view of the automation assembly machine of this invention.

As shown in the drawings the reference numeral 10 indicates generally the assembly machine of this invention. The machine 10 comprises a table 11 and a plurality of supporting legs 12. A base 13 is adapted to be fixedly mounted with respect to the legs 12 and carries a good portion of the operating mechanism of the device of this invention. The power controls for the assembly machine of this invention are housed in large boxes 14 and 15 flanking the machine on two sides thereof as shown in Figure 1.

The entire assembly machine consists of an indexing work table which is accomplished by hydraulic, electrical and mechanical means all of which cooperate to index a work-holding fixture from station-to-station around the table, lock the work-holding fixture in position at each station, and provide various safety factors to prevent operation of the machine or any of the details thereof if everything is not in perfect order. The present application is concerned only with the mechanical means for indexing the workholding fixtures around the table to the various stations thereon and is not directed to the myriad of details which go into the hydraulic and electrical controls and, hence, such controls have not been shown in this application. Further, the actual work performed on the piece being treated at each of the stations around the table are not important and although they have been shown in general outline in Figure 1, should be understood that treatment and/or assembly of parts may take any form or device and be applicable with the indexing and centering position of the work-holding fixture on this table.

One of the shorter ends of the table is shown at 16 in Figure 1. An operator utilizes this end space 16 to stand adjacent the machine and effect operation of all of the various controls thereof. Further this position enables an operator to place the several pieces to be worked upon into the machine to commence the series of work operations to be performed thereon. As shown in Figure 1 hoppers 17 and 18 are provided adjacent each side of the end to permit the operator to pick parts out of the open pans 19 and 20 which are directly fed by the hoppers 17 and 18. These parts, if mutiple numbers of parts are required and desired, are then placed into the work-holding fixture 21 which is located substantially midway between the sides of the table at the end 16 so that it is directly in front of an operator who would be standing in that location and between the feed hoppers 19 and 20 for the parts to be applied thereto. A plurality of such work-holding fixtures are positioned at uniformly spaced intervals round the entire perimeter of the indexing table. As best shown in Figure 2 successive work-holding fixtures are shown at 21, 22, 23, 24, 25, 26, 27, 28, 29, 30, 31, 32 and 33. All of the fixtures 21 through 33 inclusive are fastened to a roller chain 34 which in turn is held on the table 11 and defines substantially the perimeter of the table by means of sprockets 35, 36, 37 and 38 which are located at the corners of the table 11. The sprockets 35 through 38 inclusive are respectively mounted on vertically disposed shafts supported in the table as shown at 39, 40, 41 and 42.

As best shown in Figure 3 the sprockets 35 through 38 inclusive are in fact double sprockets such as shown for the sprocket 36 which has an upper sprocket part 43 and a lower sprocket part 44 disposed closely spaced therebeneath and mounted as a unit on the vertical shaft 40. The dual sprockets 43—44 are adapted to engage upper and lower portions 45 and 46 respectively of the roller chain 34. Thus the sprockets are adequately constructed to carry the wide chain which carries the work-holding fixtures from station-to-station around the rectangularly shaped table. It should be understood that all of the sprockets 35, 37 and 38 are constructed in a dual manner similarly to the sprockets 36 shown in detail in Figure 3.

As best shown in Figure 3 the base 13 of the table is provided with a structural member 47 mounted thereon for the purpose of carrying a fluid operated cylinder 48. The cylinder is provided with end members 49 and 50 which in turn are fastened to angle members 51 and 52 which are directly bolted as at 53 and 54 to the supporting member 47. A piston rod 55 is shown projecting from the end 50 of the fluid cylinder 48 and upon extension thereof causes an elongated gear rack member 56 to be moved in the direction of the arrow 57. The gear rack 56 is fastened by means of rivets or the like 58 to the piston rod 55 to effect concurrent movement therewith. A pinion gear 59 is journally mounted on a support 60 carried on the supporting member 47. The pinion gear 59 is mounted on a shaft 61 and thus as the elongated rack 56 is extended or withdrawn from or into the fluid cylinder 48 the pinion gear 59 and its integral shaft 61 is rotated. The upper end of the shaft 61 carries a bevel gear 62 which is in meshing engagement with a bevel gear 63 disposed at right angles thereto and substantially in a vertical plane. The bevel gear 63 is mounted on a shaft 64 which is journally carried within a post-like supporting member 65 resting on the supporting member 47. A shaft coupling 66 is adapted to engage the shaft 64 and an aligned shaft 67 for effective drive therebetween. The shaft 67 is journally mounted in the leg 12 of the table and at its inner end has mounted thereon a bevel gear 68 which lies substantially in a vertical plane. A bevel gear 69 is shown meshing with the bevel gear 68 and thus redirects the drive to a vertical shaft 70 on which the bevel gear 69 is fastened. The cooperating bevel gears 68 and 69 are carried within a housing or the like 70a located within the leg 12 which carries the vertical shaft 40 at the top thereof. An overrunning clutch 71 is fastened at one side to the lower end of the shaft 40 and by means of a coupling member 72 is fastened at its other side to the spaced apart and aligned shaft 70. It will thus be evident that an extension of the piston rod 55 from the fluid cylinder 48 will cause in turn the extension of the elongated rack 56, a rotation of the pinion gear 59 and bevel gear 62, a rotation of the bevel gear 63 and the shafts 64 and 67, a rotation of the bevel gear 68 and bevel gear 69 and its integral shaft 70, a rotation of the coupling 72 and overrunning clutch member 71, and finally the rotational drive of the shaft 40 and the dual sprocket 36 for effectively driving the chain 34 for moving the work-holding fixtures from station-to-station around the indexing table of this invention. The overrunning clutch 71 has not been shown in detail but in principle permits the uninterrupted drive from the extension of the piston rod 55 by the fluid cylinder 48 to the eventual rotation of the sprocket 36, but performs no driving function when the piston rod 55 is withdrawn into the cylinder 48. Thus the chain 34 carrying the work-holding fixtures may be advanced from station-to-station on the table but are not reversed in their direction of movement such as they would be with this present driving mechanism without the presence of the overrunning clutch 71. Further the overrunning clutch 71 permits the final indexing and centering of the work-holding fixtures in station position without causing any strain or breakage of the driving mechanism from the fluid cylinder 48 to the chain 34 and the corner sprockets 35, 36, 37 and 38.

As best shown in Figure 4 the table 11 has fixedly mounted thereon a rail member 73 which acts as one of the guide members for the movable work-holding fixtures on the table. An outwardly extending flange or lip 74 is provided along the top edge of the rail member 73 and forms a roll-engaging track 75 on its under side. The rail member 73 has an outer substantially vertical wall surface 76 beneath the undercut or lip 75 whereby a roller or the like 77 which forms part of the work-holding fixture 24 may operate in a rolling fashion around the perimeter of the table 11.

The table 11 further includes a generally plate-like member 78 mounted inwardly of the track member 73. Side wall members 79 and 80 project vertically upwardly from the inner and outer edges of the plate member 78. A top plate member 81 joins the side members 79 and 80 and forms a substantial enclosure or chamber 82 therewithin. Mounted along the top plate member 81 and disposed parallel to the wall 79 and the track member 73 is a channel member 83 having a bottom 84 and spaced apart side walls 85 and 86. These side surfaces 85 and 86 combine to form a guiding track for a roller or the like 87 carried on the work-holding fixture 24. Mounted on the inner side wall 80 and extending upwardly beyond the top plate 81 is a track member 88. The member 88 has a channel shape cut-out 89 on one of the vertical side walls thereof. The channel has a vertical bottom member 90 and horizontal side walls 91 and 92. A roller 93 journally mounted on the work-holding fixture 24 is adapted to engage the channel 89 and roll on the under surface 92 of the overhanging lip 94 comparable to the overhanging lip 74 on the track member 73.

The roller 77 is mounted on a shaft 95 which is journally carried in a fork-like lower end 96 of the vertically disposed front wall 97 of the fixture 24. The fork end 96 comprises two spaced arm members 98 and 99. The roller 77 on the shaft 95 is disposed inwardly of the wall 99 and as previously stated engages the undercut or lip 74 riding on the surface 75 thereof. A somewhat larger roll or roller 100 is mounted on the same shaft 95 and is disposed between the spaced wall or arm members 98 and 99 of the fork 96. This larger roller 100 rides directly on the table top 11 and it will thus be seen that the front wall 97 of the fixture 24 is held against vertical separation from the table by reason of the rollers 77 and 100 riding on the respective spaced apart surfaces 11 and 75. Lock nuts 101 are provided for the outer end of the shaft 95 to thus lock the assembly of rollers 77 and 100 in position on the shaft 95 in their respective locations relative to the fork arms 98 and 99 as previously described.

The roller 93 shown on the upper right-hand corner of the device in Figure 4 is mounted on a shaft 102 which in turn is journally mounted within the fork-like member 103 which depends downwardly from a top plate-like member 104 of the fixture 24. The fork 103 comprises downwardly depending spaced arms 105 and 106. A roller 107 is mounted on the shaft 102 and is located between the fork legs 105 and 106. The rollers 93 and 107 act respectively on the under surface 92 of the overhanging lip 94 of the track member 88 and on the top surface of the plate member 81. It will thus be apparent that even the back side of the work-holding fixture 24 is guided for rolling movement in a generally horizontal plane and held against vertical separation from the stationary table and its superstructure by reason of the dual rollers 93 and 107 acting on an under surface and a top surface respectively. The intermediate roller 87 on the fixture 24 prevents forward or rearward movement of the fixture relative to the stationary structure and it will thus be evident that as shown in Figure 4 the work-holding fixtures are completely confined to the track elements built into the table for smooth rolling movement therealong without any separation from the table. The work-holding fixtures and the table thus provide cooperative track elements between the two members for the purposes as described.

Angle bracket members 108 and 109 are mounted in spaced apart position adjacent the inner side of the generally vertical wall 97 of the work-holding fixture. The angle member 108 includes a vertical wall 110 which abuts and is fixedly fastened to a supporting member 111. The angularly disposed member 112 of the angle member 108 forms a horizontal ledge which supports the under side of the chain 34 for effecting movement of the fixtures from station-to-station around the indexing table. The chain portion 46 is welded or otherwise fastened to the shelf or angle arm 112 to thereupon fasten the chain to the fixture as shown in Figure 4. The angle member 109 similarly has vertical wall members 113 which abut the vertically disposed member 111 lying within an enlarged recess 111a within the wall 97 of the fixture. A horizontally disposed ledge or arm 114 of the angle member 109 is affixed to the upper portion 45 of the chain member 34 by welding or other fastening means. A rod-like member 111b projects laterally outwardly through an elongated opening 97a within the fixture wall 97. A cross arm 111c as best shown in Fig. 6 is fastened to the rod 111b and lies against the outer surface of the wall 97. There is thus provided a loose connection between chain and fixture such as will permit free adjustment of the fixtures without damaging the chain or its driving elements. The vertical member 111 and the rod 111b may have separate movement from the fixture by sliding within the elongated slots 111a and 97a. It should be obvious that all of the work-holding fixtures on the table are similarly fastened to chain links of the chain 34 to thereupon cause a driving of the fixtures when the chain is advanced such as described and shown in Figure 3.

A complete stroke of the cylinder piston rod 55 and its unitary gear rack 56 causes the fixtures to be moved one station position on the indexing table. However, when particular work is to be done on the parts held in the fixtures and such work is of a very exacting nature, it is extremely difficult to cause the fixture to become properly aligned at each of the stations on the table when reliance is made solely on the movement of the fixtures by the carrying chain 34. Thus, additional means are supplied adjacent each table station for accurately aligning and centering the fixtures in position at the stations on the table. This is possible by reason of the overrunning clutch 71 within the drive mechanism and the loose connections of the fixtures to the chain wherein the fixtures may have slight relative movement with respect to the table without occasioning back drive through the driving elements to the gear rack 56. As best shown in Figs. 4 and 5 the means for accurately locating the fixtures at their exact station positions on the table is shown. It will be understood that although only the fixture 24 is being shown with its locating means that all of the fixtures similarly have locating or fixture positioning mechanisms exactly the same. A hydraulic cylinder 115 is mounted to and suspended from the table 11. The body of the cylinder extends downwardly from the table 11 and is disposed in a generally vertical position. A piston rod 116 projects upwardly out of the cylinder 115 and passes through the table 11 and the frame member 78 lying thereover. An aperture through the member 78 is shown at 117 for the passage of the piston rod 116. A piston, not shown, within the cylinder 115 is adapted to be reciprocated therein to thus cause vertical shifting movement of the piston rod 116. Fig. 4 shows the piston rod 116 in its uppermost position and in the position it occupies during movement of the fixtures from one station to another and all intermediate positions excepting the times when the fixtures are locked in their station positions and at a time when work is being performed on the pieces held by the fixtures. Fig. 5 shows the piston rod 116 in its lowermost position or in the position in which the piston is withdrawn within the hydraulic cylinder 115 its maximum distance.

A puller 118 is threadedly engaged to the upper end of the piston rod 116 as shown at 119. The puller element 118 is so named because it is used to pull an aligning element down from the movable fixture into the stationary frame structure as will be hereinafter described. The puller 118 is substantially cylindrical in shape and has an upwardly opening keyhole type of slot in the top thereof as shown at 120. The keyhole slot has an opening 121 in the top of the puller member 118 and has an enlarged opening portion 122 therebeneath which passes laterally through the puller member 118 from one side to the other. The juncture between the top opening 121 and the enlarged chamber 122 is defined by inwardly projecting lips or ledges 123 and 124 extending inwardly from opposite sides of the puller member 118 and adjacent the top thereof. The cylindrical puller 118 has a flat ground on the lower side thereof as shown at 118a. A block 80a is mounted on the member 80 of the frame structure and thus the puller is prevented from rotating. This insures that the opening in the top thereof will always be ready to receive the fixture centering pin as will be described. The locating or fixture centering pin is shown generally at 125 and includes a relatively long vertically disposed shank 126 and an upper threaded extension 127 to which is fastened an enlarged nut or the like 128 in threaded engagement therewith. The nut 128 simulates a collar and rests on the top of the fixture superstructure 129 which acts as a shoulder therefor. The vertically disposed shank 126 and its collar 128 is vertically slidable within the movable fixture 24. The position of the tapered pin in Fig. 4 is in its uppermost position and in Fig. 5 the pin is shown pulled downwardly into fixture centering position. The lower end of the pin member 125 is provided with an inverted T-shape having an enlarged flange head 130 positioned beneath a relatively narrow portion 131 of the shank. The elements 130 and 131 thus constitute the inverted T just mentioned. In Fig. 4 the location of the disk-like flange 130 is shown spaced beneath the fixture member 104 a distance substantially the length of the shank portion 131. Thus, as the fixture 24 is moved by reason of movement of the roller chain 24 the puller member slides over the under head 130 of the pin member 125 so that the inwardly extending lips 123 and 124 of the puller lie on the top side of the disk-like flange 130 and adjacent the shank portion 131. As shown in Fig. 5 the puller member has been moved downwardly by reason of actuation of the hydraulic cylinder and piston so that the pin member 125 and its components have also been pulled downwardly to the new position as shown therein.

The centering pin 125 is equipped with a second enlarged annular flange 132 which as shown in Fig. 4 rests substantially immediately beneath the transverse member 104 of the fixture 24. In the showing of the device in Fig. 5 wherein the puller 118 has caused the pin 125 to be pulled downwardly the enlarged annular flange 132 is shown within a cylindrical opening 133 within the stationary frame member 81 on which and along which the fixture 24 rides. Thus, when the pin 125 is in the position shown in Fig. 5 the fixture 24 is firmly and securely held in fixed position with respect to the frame structure and because of the relatively snug engagement of the flange 132 with the opening 133 there is no variation in fixture position whenever that fixture or any of the fixtures arrive at any one station on the indexing table. The lower end of the enlarged annular flange 132 which is spaced upwardly from the lower cap flange 130 is tapered as shown at 134 so that as the pin 125 and its flange 132 enters the cylindrical opening 133 in the frame member 81 it corrects any lateral offsetting of the fixture with respect to the frame structure and provides for a guiding or a piloting of the pin within the opening and thus an absolute centering of the fixture in its home station position.

The pin 125 is provided with a shallow V-groove disposed annularly around the shank portion 126 of the pin and at a position to receive a spring loaded detent 136 in the form of a ball. A spring 137 is adapted to urge the ball in the direction of the pin 125 and when the pin is in its uppermost position as shown in Fig. 4 the ball detent 136 tends to hold and maintain the pin in that upper position. A screw plug 138 constitutes the backing for the spring 137 and is threadedly engaged within an opening in the portion 104 of the slidable fixture 24. Obviously, the ball detent 136 is easily yieldable to compress the spring 137 and permit downward pulling of the tapered pin 125 by reason of actuation of the puller member 118.

In operation the fixtures are moved as previously explained by their engagement to the roller chain 34 and stop approximately at each station position on the indexing table. This is, of course, accomplished by operation of the reciprocable gear rack 56 shown in Fig. 3. When the fixtures arrive at each station the key head 130—131 of the tapered pilot or centering pin slides within the keyhole slot 120 of the puller member 118. When the hydraulic cylinder 115 is actuated to retract the piston rod 116 the puller member 118 is pulled downwardly as shown in Fig. 5 carrying with it the pin 125 in such a manner that the tapered lower end 134 of the enlarged annular flange 132 causes the fixture 24 to be centered with respect to the cylindrical passage or opening 133 within the frame member 81 of the general frame supporting structure of this table. It is thus apparent that in such condition the fixture is absolutely fixed with respect to the frame structure and in each station the fixture is in exactly the same position every time so that work performed on the pieces of material carried by the fixtures will always be uniform. After the work has been completed at each of the stations, the hydraulic cylinder 115 has its operation reversed and the puller 118 becomes a pusher and the pin is driven upwardly from out of its engagement with the socket or opening 133 in the frame structure and the pin is held in its uppermost position by the spring-held ball detent 136. The fixture 24 may now be moved to its next station by movement of the chain 34 in the manner previously described.

The device of this invention has been built to accommodate the assembling of breaker arms for electrical distributors used primarily in vehicles. However, the indexing table is usable for any and all assembly or work operations wherein it is desired to perform a number of tasks on the same work piece and wherein it is desirable to move this work piece from station-to-station to perform different operations thereon. Thus, in view of the universal use of the indexing table the particular functions that this breaker arm assembly table is designed for will not be described in detail. It is sufficient to understand that the indexing table has work-holding fixtures as just described which are capable of moving from station to station on the table and be held in fixed centered position in each of the several stations so that work performed on the pieces held by the fixtures will be identical in each instance.

Numerous details of construction may be varied throughout a wide range without departing from the principles disclosed herein and I, therefore, do not propose limiting the patent granted hereon otherwise than as necessitated by the appended claims.

What is claimed is:

1. A work-indexing table including track means on the table, work-holding fixtures having track engaging roller elements thereon in engagement with said table track means, chain means mounted on said table adjacent said table track means, means fastening said work-holding fixtures to said chain means, means driving said chain means in substantially uniform increments, means separately from said chain for fixedly centering said fixtures in specific station positions around the indexing table, said means separately from said chain including cooperative means between the indexing table and the work-holding fixtures whereby the work-holding fixtures are securely clamped in position during a period of time in which the work-holding fixtures remain at the station, said cooperative means including a puller member journalled for vertical sliding movement on said indexing table, tapered pin means journally slidable for vertical sliding movement on each of said work-holding fixtures, and interlocking means between said puller member and said tapered pin means.

2. A device as set forth in claim 1 in which the interlocking means includes an open-sided keyhole slot in the top of said puller member and an inverted T-head on the lower end of said tapered pin means for slidable engagement with the keyhole slot of the puller member as the work-holding fixture moves into the station position.

3. A device as set forth in claim 2 in which the tapered pin means includes an enlarged annular flange with a tapered lower end and the indexing table has a cylindrical opening at each station to snugly receive the enlarged annular flange of the tapered pin means.

4. A device as set forth in claim 1 in which the tapered pin means has a shallow V-groove between the ends thereof, and a spring-urged ball detent mounted on said indexing table for engagement with the shallow V-groove to thereby hold the tapered pin means in its inoperative position at all times except when otherwise desired.

5. A work-indexing table including track means on the table, work-holding fixtures having track engaging roller elements thereon in engagement with said table track means, chain means mounted on said table adjacent said table track means, means fastening said work-holding fixtures to said chain means, means driving said chain means in substantially uniform increments, means separately from said chain for fixedly centering said fixtures in specific station positions around the indexing table, said means fastening said work-holding fixtures to said chain means including a loose connection.

6. A work-indexing table including track means on the table, work-holding fixtures having track engaging roller elements thereon in engagement with said table track means, chain means mounted on said table adjacent said table track means, means fastening said work-holding fixtures to said chain means, means driving said chain means in substantially uniform increments, means separately from said chain for fixedly centering said fixtures in specific station positions around the indexing table, said means fastening said work-holding fixtures to said chain means including a rod member fastened directly to said chain means, said fixtures having an elongated aperture therein to loosely receive said rod member, and means holding said rod member within said elongated aperture.

References Cited in the file of this patent

UNITED STATES PATENTS

| | | |
|---|---|---|
| 1,715,141 | Mathieson | May 28, 1929 |
| 2,392,169 | Mansfield | Jan. 1, 1946 |
| 2,793,733 | Karageorgieff | May 28, 1957 |